(12) United States Patent
Wang

(10) Patent No.: US 9,168,620 B2
(45) Date of Patent: Oct. 27, 2015

(54) LENS MODULE ASSEMBLING DEVICE

(71) Applicant: HON HAI PRECISION INDUSTRY CO., LTD., New Taipei (TW)

(72) Inventor: Chien-Chun Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 292 days.

(21) Appl. No.: 13/916,585

(22) Filed: Jun. 13, 2013

(65) Prior Publication Data
US 2014/0013560 A1    Jan. 16, 2014

(30) Foreign Application Priority Data

Jul. 12, 2012  (TW) .............................. 101125203 A

(51) Int. Cl.
B23P 19/04 (2006.01)
H04M 1/02 (2006.01)
G02B 7/02 (2006.01)

(52) U.S. Cl.
CPC ................. B23P 19/04 (2013.01); G02B 7/022 (2013.01); H04M 1/0264 (2013.01); Y10T 29/53961 (2015.01)

(58) Field of Classification Search
CPC ...... B23P 19/04; G02B 7/022; H04M 1/0264; Y10T 29/53961
See application file for complete search history.

(56) References Cited

U.S. PATENT DOCUMENTS

| 4,425,504 | A | * | 1/1984 | Turnbull et al. | ............... 250/353 |
| 6,222,610 | B1 | * | 4/2001 | Hagiwara et al. | ............... 355/30 |
| 6,762,412 | B1 | * | 7/2004 | Akagawa et al. | ........ 250/363.07 |
| 2002/0131782 | A1 | * | 9/2002 | Yamaguchi et al. | .......... 396/429 |
| 2005/0117048 | A1 | * | 6/2005 | Matsushita et al. | ........... 348/340 |
| 2007/0114699 | A1 | * | 5/2007 | Chang | ........................... 264/335 |
| 2008/0051017 | A1 | * | 2/2008 | Jiang et al. | .................... 451/384 |
| 2011/0310497 | A1 | * | 12/2011 | Ashcraft et al. | .............. 359/811 |

FOREIGN PATENT DOCUMENTS

DE         3934180 A1 *  4/1990
WO    WO 2007074240 A2 *  7/2007

* cited by examiner

Primary Examiner — Lee D Wilson
Assistant Examiner — Joel Crandall
(74) Attorney, Agent, or Firm — Novak Druce Connolly Bove + Quigg LLP

(57) ABSTRACT

A lens module assembling device includes a platform, a deformable support member, a deformable limiting unit and a gas blowing device. The platform includes a first surface and a second surface opposite to the first surface, the platform includes a receiving recess configured for receiving the deformable support member. The platform includes a bottom surface defines a plurality of through holes. The through holes through the bottom surface and the second surface. The deformable support member is placed on the bottom surface in a way such that the through holes are exposed. The deformable limiting unit is arranged on the first surface. The deformable limiting unit defines a limiting hole limiting the lens barrel in the recess. The gas blowing device is arranged below the second surface of the platform and configured for blowing gas to the lens module through the through holes.

12 Claims, 5 Drawing Sheets

LENS MODULE ASSEMBLING DEVICE

BACKGROUND

1. Technical Field

The present disclosure relates to lens module assembling devices.

2. Description of Related Art

Lens modules are widely employed in camera systems and mobile phones for image capturing. When assembling a lens module, it usually needs an assembling platform to hold a lens barrel. However, the assembling platform is made from metal, and the lens barrel inevitably contacts with the assembling platform during the assembling process, and exterior of the lens barrel is easily damaged.

Therefore, it is desired to provide a lens module assembling device which can overcome the above mentioned problems.

DETAILED DESCRIPTION

Figure 1:
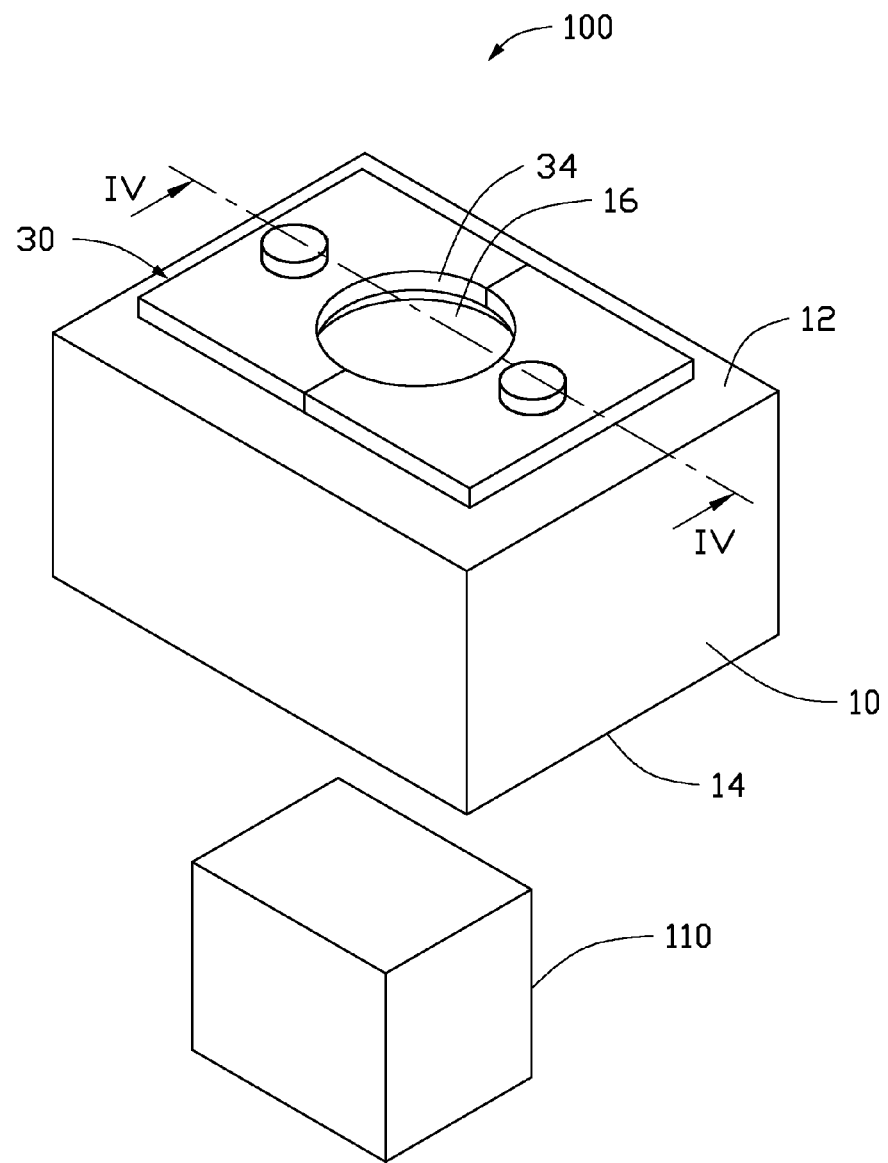
FIG. 1 is a schematic view of a lens module assembling device including a platform according to an exemplary embodiment.
Figure 2:
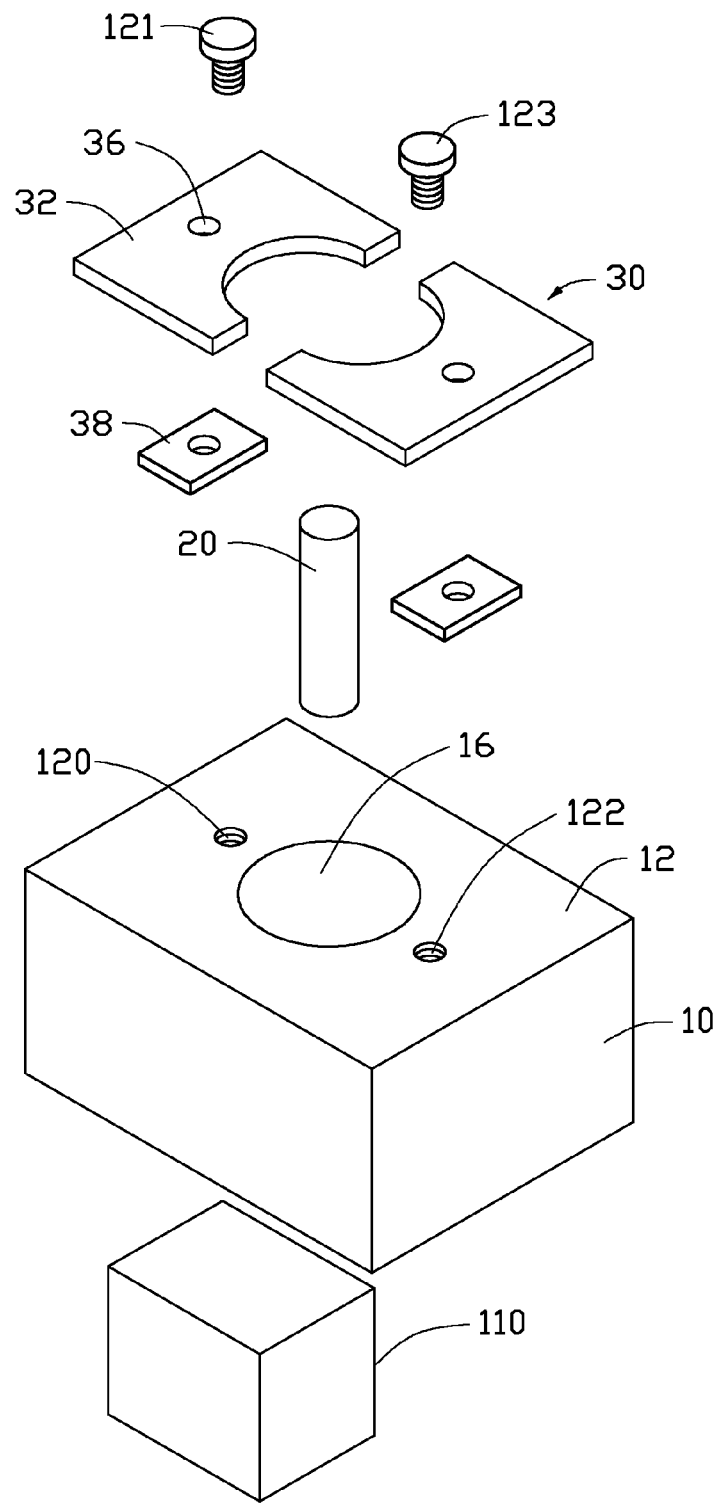
FIG. 2 is an exploded view of the lens module assembling device of FIG. 1.
Figure 3:
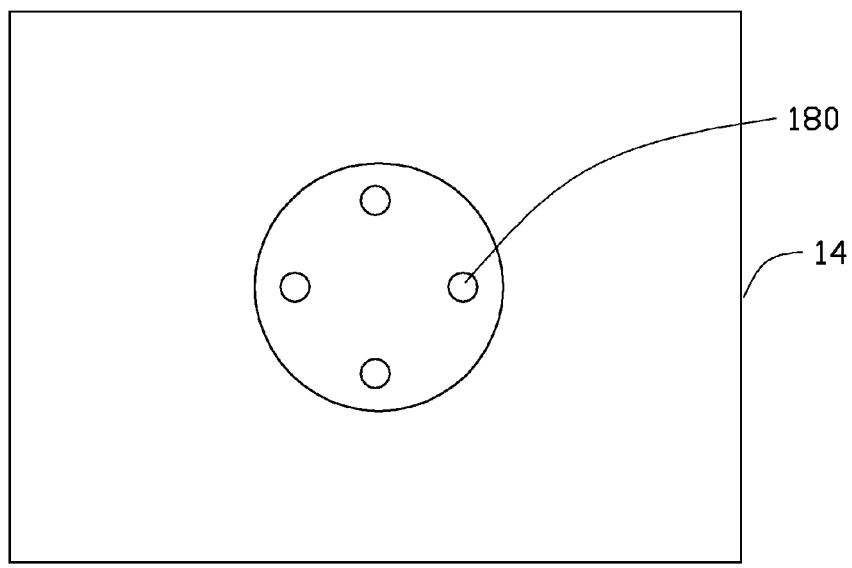
FIG. 3 is a bottom view of the platform of FIG. 1.
Figure 4:
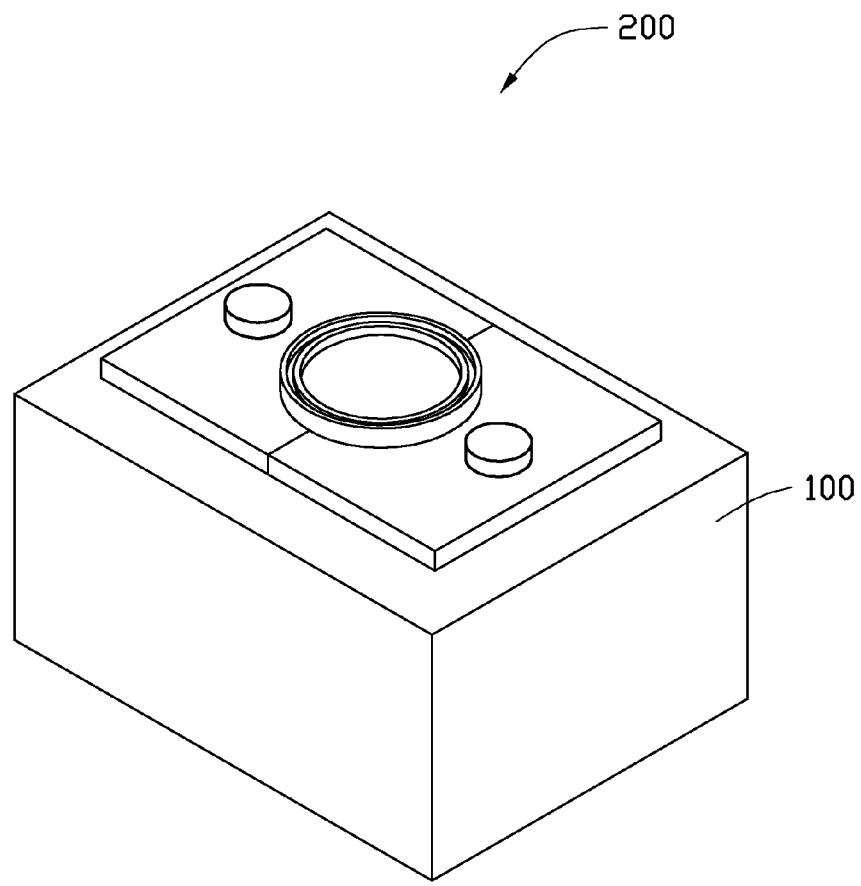
FIG. 4 is a schematic view showing an assembling state of a lens module using the lens module assembling device of FIG. 1.
Figure 5:
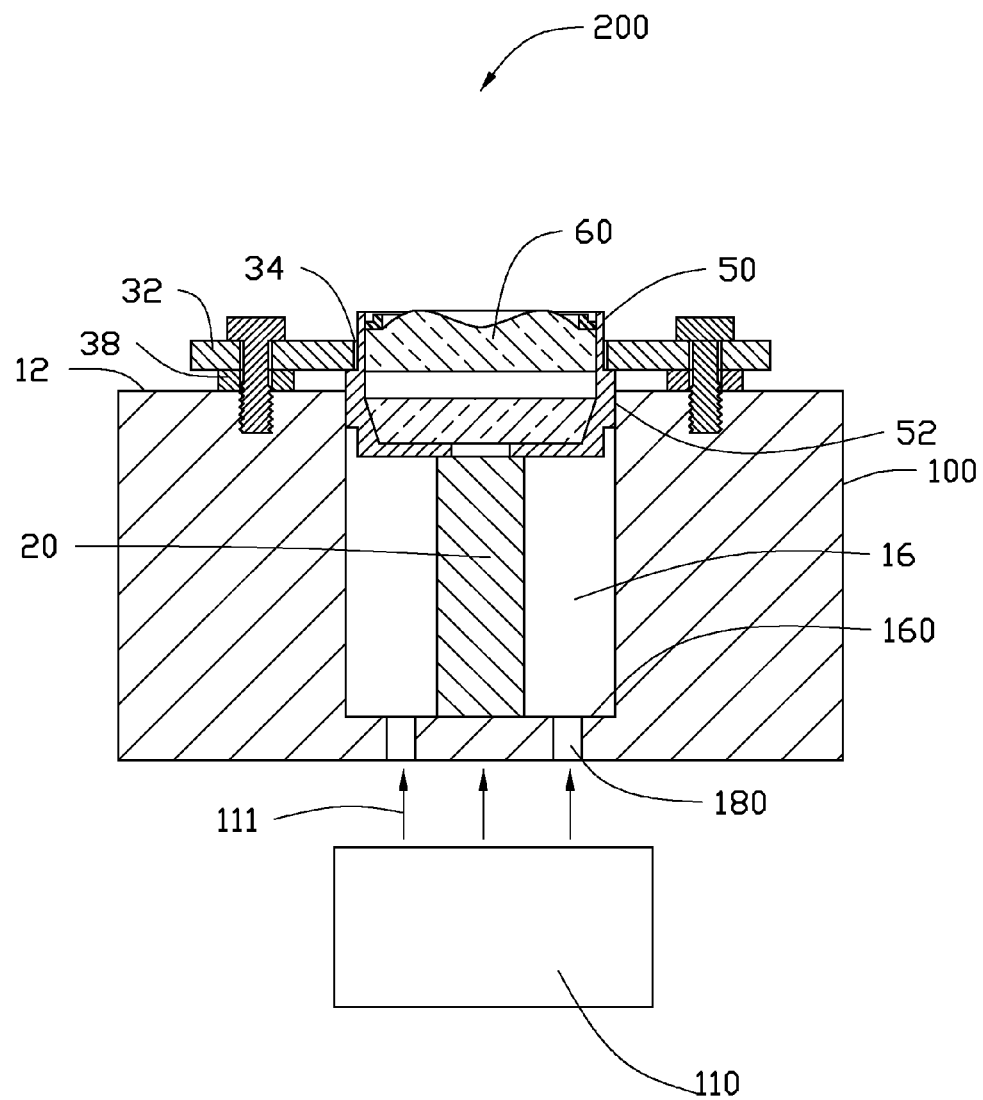
FIG. 5 is a cross-sectional view taken along the line V-V of FIG. 4.

FIGS. 1-5 show a lens module assembling device 100 according to an exemplary embodiment. The lens module assembling device 100 includes a platform 10, a deformable support member 20, a deformable limiting unit 30, and a gas blowing device 110.

The platform 10 is substantially cuboid. The material of the platform 10 is metal. The platform 10 includes a first surface 12 and a second surface 14 opposite to the first surface 12. The first surface 12 defines a receiving recess 16 configured for receiving the deformable support member 20. An inner diameter of the groove 16 is slightly greater than a diameter of a lens barrel 50. This ensures that the lens barrel 50 is not inclined during an assembling process. The platform 10 includes a bottom surface 160 in the receiving recess 16. The platform 10 also includes a number of through holes 180 extending through the bottom surface 160. The through holes 180 are uniformly distributed on the bottom surface 160 and through the bottom surface 160 and the second surface 14.

The deformable support member 20 is positioned in the receiving recess 16 on the bottom surface 160 in such a way that the through holes 180 are exposed and the through holes 180 surround the support member 20. The deformable support member 20 supports the lens barrel 50. The height of the deformable support member 20 is less than the depth of the recess 16 and this ensures that a portion of the lens barrel 50 is received in the recess 16. The deformable support member 20 is substantially a cylinder. The material of the deformable support member 20 is sponge, rubber, soft wood or foam plastic.

The deformable limiting unit 30 is arranged on the first surface 12. The deformable limiting unit 30 includes a limiting hole 34 configured for extension a portion of a lens therethrough, and the limiting unit 30 configured for blocking the lens module from moving out of the recess 16. The lens barrel 50 is arranged on the deformable support member 20 during the assembling process. In this embodiment, the limiting unit 30 includes two limiting pieces 32, and the two limiting pieces 32 cooperatively form the limiting hole 34. Each of the limiting pieces 32 defines a hole 36 and includes a semicircle surface for conforming to an outer wall of the lens barrel 50 of the lens module. The limiting piece 32 is made from sponge, rubber, wood or foam plastic.

The lens module assembling device 100 also includes a first screw 121 and a second screw 123, and the first surface 12 defines a first screw hole 120 and a second screw hole 122. The first screw hole 120 and the second screw hole 122 are located on opposite sides of the recess 16. The first screw 121 penetrates the hole 36 and is engaged in the first screw hole 120 to fix the one limiting piece 32 on the first surface 12. The second screw 123 penetrates the hole 36 and is engaged with the second screw hole 122 to fix the other limiting piece 32 on the first surface 12. In the this embodiment, the lens module assembling device 100 also includes two spacers 38, each of the spacers 38 is sandwiched between the first surface 12 and the limiting piece 32 to adjust the distance between the limiting hole 34 and the first surface 12.

The gas blowing device 110 is arranged below the second surface 14 of the platform 10, and configured for blowing gas to the lens barrel 50 through the through holes 180. The gas blowing device 110 includes a control system (not shown), and pressure parameter of air flow and duration parameter are predetermined in the control system.

An assembling method using the lens module assembling device 100 includes the following steps.

Step 1: The lens module assembling device 100 is provided. The limiting piece 32 is not mounted.

Step 2: The lens barrel 50 and two optical elements 60 are provided. In this embodiment, the two optical elements 60 are respectively an optical lens and a spacer ring. The lens barrel 50 includes a projection 52 along the peripheral of the lens barrel 50. First, the lens barrel 50 is placed on the flexible supporting part 20. In the embodiment, an end of the lens barrel 50 with a light aperture is placed on the flexible supporting part 20. Second, the lens barrel 50 is limited by the two limiting pieces 32 with the limiting hole 34. In the embodiment, the spacer 38 is placed on the first surface 12 and the limiting piece 32 is located above the spacer 38. The first screw 121 penetrates the hole 36, the spacer 38 and the first screw hole 120 and then fastens the one limiting piece 32 on the first surface 12. The second screw 123 penetrates the spacer 38, the other limiting piece 32 and the second screw hole 122 and fastens the other limiting piece 32 on the first surface 12.

Step 3: The gas blowing device 110 is opened to apply stable air flow 111. The air flow 111 can arrive at the bottom end of the lens barrel 50 via the through holes 180. A suction nozzle (not shown) is applied to pick up the optical elements 60 and assembles them into the lens barrel 50, and then a lens module is obtained. In this embodiment, the buoyant force applied by the gas blowing device 110 is greater than the pressure force applied by the suction nozzle and the gravity of the lens module. In this embodiment, the lens barrel 50 is not in contact with the flexible supporting part 20 during the assembling process, and damage to the lens module is avoided.

Step 4: the gas blowing device 110 is shut down, and the lens module is moved away.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A lens module assembling device comprising:
a platform comprising a first surface and a second surface opposite to the first surface, the first surface defining a receiving recess, the platform comprising a bottom surface in the receiving recess, the platform including a plurality of through holes extending through the bottom surface and the second surface;
a deformable support member positioned in the receiving recess on the bottom surface, the through holes being exposed and surrounding the support member;
a deformable limiting unit arranged on the first surface, the deformable limiting unit comprising a limiting hole configured for extension a portion of a lens module therethrough, the limiting unit configured for blocking the lens module from moving out of the recess; and
a gas blowing device arranged below the second surface of the platform, and configured for blowing gas to the lens module through the through holes.

2. The lens module assembling device of claim 1, wherein the through holes are uniformly distributed on the bottom surface.

3. The lens module assembling device of claim 1, wherein a material of the deformable support member is selected from the group consisting of from sponge, rubber, soft wood and foam plastic.

4. The lens module assembling device of claim 1, wherein the platform is made from metal.

5. The lens module assembling device of claim 1, wherein the platform is substantially a cuboid.

6. The lens module assembling device of claim 1, wherein the deformable supporting member is substantially a cylinder.

7. The lens module assembling device of claim 1, wherein a height of the deformable supporting member is less than a depth of the recess.

8. The lens module assembling device of claim 1, wherein the limiting unit includes two limiting pieces, and the two limiting pieces cooperatively form the limiting hole.

9. The lens module assembling device of claim 1, wherein each of the limiting piece includes a semicircle surface for conforming to an outer wall of a lens barrel of the lens module.

10. The lens module assembling device of claim 1, wherein a material of the limiting piece is selected form the group consisting of sponge, rubber, wood and foam plastic.

11. The lens module assembling device of claim 8, wherein the lens module assembling device further comprising a first screw and a second screw, the first surface defines a first screw hole and a second screw hole, the first screw hole and the second hole are located on opposite sides of the recess, the first screw penetrates one of the limiting piece and the first screw hole and fixes the limiting piece on the first surface, the second screw penetrates the other limiting piece and the second screw hole and fixes the other limiting piece on the first surface.

12. The lens module assembling device of claim 8, wherein the lens module assembling device further comprising spacers sandwiched between the first surface and the limiting pieces.

* * * * *